United States Patent
Prasad et al.

(10) Patent No.: US 12,192,940 B2
(45) Date of Patent: Jan. 7, 2025

(54) METHOD AND APPARATUS FOR TIMING ADVANCE PREDICTION

(71) Applicant: Sierra Wireless, Inc., Richmond (CA)

(72) Inventors: Gautham Prasad, Vancouver (CA); Nadhem Rojbi, Vancouver (CA); Gustav Gerald Vos, Surrey (CA); Lutz Hans-Joachim Lampe, Vancouver (CA)

(73) Assignee: SEMTECH CORPORATION, Camarillo, CA (US)

( * ) Notice: Subject to any disclaimer, the term of this patent is extended or adjusted under 35 U.S.C. 154(b) by 280 days.

(21) Appl. No.: 17/703,879

(22) Filed: Mar. 24, 2022

(65) Prior Publication Data

US 2022/0312357 A1     Sep. 29, 2022

Related U.S. Application Data

(60) Provisional application No. 63/167,467, filed on Mar. 29, 2021.

(51) Int. Cl.
*H04W 56/00* (2009.01)
*H04B 17/318* (2015.01)

(52) U.S. Cl.
CPC ...... *H04W 56/0045* (2013.01); *H04B 17/318* (2015.01)

(58) Field of Classification Search
CPC .......... H04W 56/0045; H04W 56/0055; H04B 17/318; H04B 17/27; H04B 17/373; H04B 17/3913
See application file for complete search history.

(56) References Cited

U.S. PATENT DOCUMENTS

| 10,701,655 B1 | 6/2020 | Shih et al. |
| 11,399,355 B2 | 7/2022 | Vos et al. |

(Continued)

FOREIGN PATENT DOCUMENTS

| CN | 110536471 | 12/2019 |
| EP | 20755825.5 | 10/2022 |

(Continued)

OTHER PUBLICATIONS

3GPP, "3rd Generation Partnership Project; Technical Specification Group Radio Access Network; Evolved Universal Terrestrial Radio Access (E-UTRA); Further Advancements for E-UTRA Physical Layer Aspects (Release 9)", 3GPP TR 36.814 V9.0.0, Mar. 2010, France, 107 pages.

(Continued)

*Primary Examiner* — Jamal Javaid
(74) *Attorney, Agent, or Firm* — Wells St. John P.S.

(57) ABSTRACT

There are provided methods for predicting timing advance (TA) with respect to a base station. According to some embodiments, the method includes determining, by a user equipment (UE), a set of TAs, each TA corresponding to a particular distance from the base station and measuring, by the UE, a set of instances of a power metric, each instance of the power metric associated with a respective distance from the base station. The method further includes determining, by the UE, a set of differences between each of the instances of the power metric and determining, by the UE, a new TA at least in part using the set of TAs and the set of differences.

20 Claims, 7 Drawing Sheets

(56) References Cited

U.S. PATENT DOCUMENTS

| | | | |
|---|---|---|---|
| 2019/0141754 A1* | 5/2019 | Bai | ................ H04L 5/0048 |
| 2020/0107396 A1 | 4/2020 | Wang et al. | |
| 2020/0260397 A1 | 8/2020 | Vos et al. | |
| 2021/0152318 A1 | 5/2021 | Park et al. | |
| 2021/0306968 A1 | 9/2021 | Liberg et al. | |
| 2021/0400567 A1 | 12/2021 | Sha et al. | |
| 2022/0201636 A1 | 6/2022 | Liu et al. | |

FOREIGN PATENT DOCUMENTS

| | | |
|---|---|---|
| WO | WO 2020/026154 | 2/2020 |
| WO | WO 2020/034571 | 2/2020 |
| WO | WO 2020/163957 | 8/2020 |
| WO | PCT/CA2020/050189 | 8/2021 |

OTHER PUBLICATIONS

3GPP, "3rd Generation Partnership Project; Technical Specification Group Radio Access Network; Evolved Universal Terrestrial Radio Access (E-UTRA); Further Advancements for E-UTRA Physical Layer Aspects (Release 9)", 3GPP TR 36.814 V9.2.0, Mar. 2017, France, 105 pages.

3GPP, "3rd Generation Partnership Project; Technical Specification Group Radio Access Network; Evolved Universal Terrestrial Radio Access (E-UTRA); Requirements for Support of Radio Resource Management (Release 13)", 3GPP TS 36.133 V13.3.0, Mar. 2016, France, 1581 pages.

3GPP, "LTE-M Preconfigured UL Resources Summary RAN1 #95", Sierra Wireless, 3GPP TSG RAN WG1 Meeting #95, R1-183725, Nov. 12-16, 2018, United States, 9 pages.

3GPP, "LTE-M PUR RSRP TA Validation Design Considerations", 3GPP TSG RAN WG4 #91, R4-1905499, May 13-17, 2019, United States, 8 pages.

3GPP, "New WID on Rel-16 MTC Enhancements for LTE", Ericsson, 3GPP TSG RAN Meeting #80, RP-181450, Jun. 11-14, 2018, United States, 4 pages.

3GPP, "Pre-Configured UL Resources Design Considerations", Sierra Wireless, 3GPP TSG RAN WG2 Meeting #104, R2-1817940, Nov. 2018, United States, 8 pages.

3GPP, "Support for Transmission in Preconfigured UL Resources in LTE-MTC", Ericsson, 3GPP TSG-RAN WG1 Meeting #94bis, R1-1810186, Oct. 8-12, 2018, China, 8 pages.

3GPP, "Support for Transmission in Preconfigured UL Resources in NB-IoT", Ericsson, 3GPP TSG-RAN WG1 Meeting #94bis, R1-1810195, Oct. 8-12, 2018, China, 8 pages.

ETSI, "Digital Cellular Telecommunications System (Phase 2+) (GSM); Universal Mobile Telecommunications System(UMTS); LTE; 5G; Release 16 Description; Summary of Rel-16 Work Items (3GPP TR 21.916 Version 16.2.0 Release 16)", ETSI TR 121 916 V16.2.0, Jul. 2022, France, 168 pages.

ETSI, "LTE; Evolved Universal Terrestrial Radio Access (E-UTRA); Physical Channels and Modulation (3GPP TS 36.211 Version 14.2.0 Release 14)", ETSI TS 136 211 V14.2.0, Apr. 2017, France, 196 pages.

ETSI, "LTE; Evolved Universal Terrestrial Radio Access (E-UTRA); Physical Layer; Measurements (3GPP TS 36.214 Version 10.1.0 Release 10)", ETSI TS 136 214 V10.1.0, Apr. 2011, France, 15 pages.

ETSI, "LTE; Evolved Universal Terrestrial Radio Access (E-UTRA); Physical Layer; Measurements (3GPP TS 36.214 Version 15.5.0 Release 15)", ETSI TS 136 214 V15.5.0, Jan. 2020, France, 28 pages.

Prasad et al., U.S. Appl. No. 63/167,467, filed Mar. 29, 2021, titled "Method and Apparatus for Timing Advance Prediction", 32 pages.

* cited by examiner

FIG. 1

(Prior Art)

100

102 Determining, by a user equipment (UE), a first distance from the base station.

104 Measuring, by the UE, a first instance of a power metric in relation to the base station.

106 Measuring, by the UE, a second instance of the power metric in relation to the base station.

108 Determining, by the UE, a second distance from the base station at least in part using the first distance, the first instance of the power metric and the second instance of the power metric.

202 Determining, by a user equipment (UE), a set of TAs, each TA corresponding to a particular distance from the base station.

204 Measuring, by the UE, a set of instances of a power metric, each instance of the power metric associated with a respective distance from the base station.

206 Determining, by the UE, a set of differences between each of the instances of the power metric.

208 Determining, by the UE, a new TA at least in part using the set of TAs and the set of differences.

METHOD AND APPARATUS FOR TIMING ADVANCE PREDICTION

CROSS-REFERENCE TO RELATED APPLICATIONS

This application claims the benefit and priority from U.S. Provisional Patent Application No. 63/167,467 filed Mar. 29, 2021, titled "Method and Apparatus for Timing Advance Prediction", the contents of which are incorporated herein by reference in their entirety.

FIELD

The present invention pertains to the field of wireless communications, and in particular to methods and apparatuses for timing advance prediction.

BACKGROUND

Figure 1:
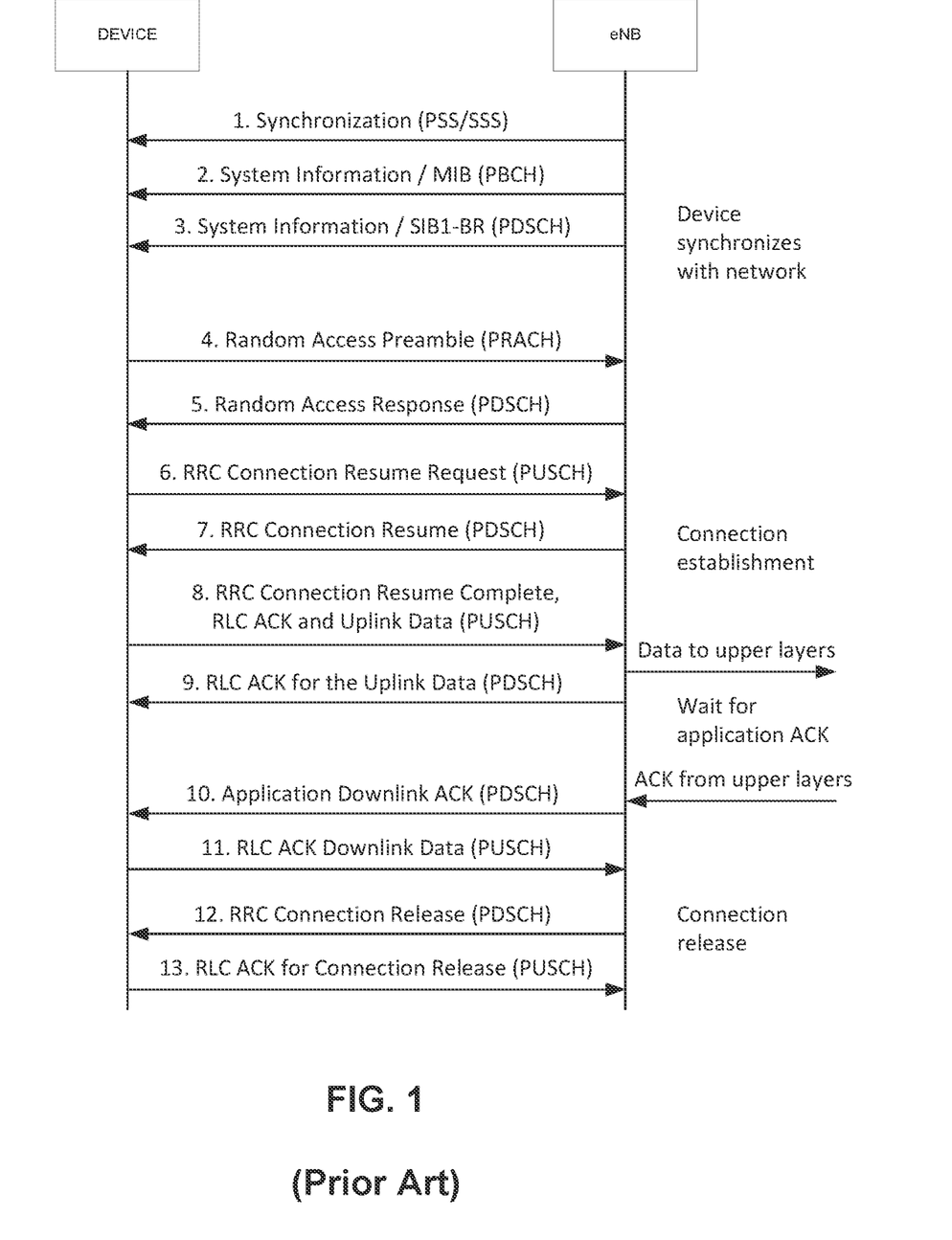
FIG. 1 illustrates a random-access channel (RACH) procedure according to the prior art.

In wireless communications, a timing advance (TA) is the amount of time it takes for base station transmission to reach a user equipment (UE) plus the amount of time it takes the UE's transmission to reach the base station. In the legacy random-access channel (RACH) procedure, for example as illustrated in FIG. 1, the TA is measured by the base station from a message and then sent to the UE in a response. In 3GPP Rel-16, machine-type communication (MTC) enhancements have led to supporting the transmission in preconfigured uplink resources (PUR) in idle mode, so that a UE can skip the legacy RACH procedures and start transmission when its PUR is allocated.

However, the UE can only transmit on PUR if it has a valid TA. When a UE moves, the TA will change, thus for mobile UEs, a UE must make sure that it has a valid TA before a PUR transmission. Further, the condition of validating a previously held TA to use PUR has the drawback that when the TA is found to be invalid, the UE has no other option but to fall back to either legacy RACH or early data transmission (EDT). This undermines the benefits that PUR can provide. Instead, if a UE could accurately estimate and predict its TA from any location, it could always use PURs.

Accordingly, there may be a need for methods and devices, that are not subject to one or more limitations of the prior art.

This background information is provided to reveal information believed by the applicant to be of possible relevance to the present invention. No admission is necessarily intended, nor should be construed, that any of the preceding information constitutes prior art against the present invention.

SUMMARY

An object of embodiments of the present disclosure is to provide methods and devices for techniques for timing advance prediction.

According to an aspect of the present disclosure, there is provided a method for predicting timing advance (TA) with respect to a base station. The method includes determining, by a user equipment (UE), a set of TAs, each TA corresponding to a particular distance from the base station and measuring, by the UE, a set of instances of a power metric, each instance of the power metric associated with a respective distance from the base station. The method further includes determining, by the UE, a set of differences between each of the instances of the power metric and determining, by the UE, a new TA at least in part using the set of TAs and the set of differences.

In some embodiments, the power metric is at least one of a reference signal received power (RSRP), an earliest arriving multipath and a received signal strength indicator (RSSI). In some embodiments, the power metric is measured over only one sub-frame of a cell-specific reference signal (CRS). In some embodiments, the power metric is measured over a set of sub-frames of a cell-specific reference signal (CRS). In some embodiments, a maximum measurement from the set of sub-frames is used. In some embodiments, the set of sub-frames is not consecutive.

In some embodiments, the step of determining the new TA is performed using a machine learning regressor. In some embodiments, the machine learning regressor is configured as a multi-point regressor, the machine learning regressor determining the new TA using the set of TAs and the set of differences between each of the instances of the power metric simultaneously. In some embodiments, the machine learning regressor is configured as a multi-point regressor, the machine learning regressor determining a plurality of estimated TAs, each estimated TA based on one or more determined TAs and one or more associated differences, the machine learning regressor further determining the new TA based on an average of the plurality of estimated TA. In some embodiments, the machine learning regressor at least in part uses feedback from a base station for determining the new TA. In some embodiments, the machine learning regressor at least in part uses a pattern of movement of the UE for determining the new TA.

According to an aspect of the present disclosure, there is provided a method for predicting timing advance with respect to a base station. The method includes determining, by a user equipment (UE), a first distance from the base station and measuring, by the UE, a first instance of a power metric in relation to the base station. The method further includes measuring, by the UE, a second instance of the power metric in relation to the base station and determining, by the UE, a second distance from the base station at least in part using the first distance, the first instance of the power metric and the second instance of the power metric.

According to an aspect of the present disclosure, there is provided a method for predicting timing advance (TA) with respect to a base station. The method includes determining, by a user equipment (UE), a set of TAs, each TA corresponding to a particular distance from base station and measuring, by the UE, a set of instances of a communication metric, each instance associated with a particular distance from the base station. The method further includes determining, by the UE, a set of differences between each of the instances of the communication metric and determining, by the UE, a new TA at least in part using the set of TAs and the set of differences.

In some embodiments, the communication metric is at least one of a time of arrival (ToA) and a strongest multipath component of a received signal. In some embodiments, the communication metric is measured over only one sub-frame of a cell-specific reference signal (CRS). In some embodiments, the communication metric is measured over a set of sub-frames of a cell-specific reference signal (CRS). In some embodiments, a maximum measurement from the set of sub-frames is used. In some embodiments, the set of sub-frames is not consecutive.

According to an aspect of the present disclosure, there is provided a user equipment including a processor and a memory having stored thereon machine executable instructions. The machine executable instructions when executed by the processor configure the UE to perform one or more of the methods as defined above or elsewhere herein.

Embodiments have been described above in conjunctions with aspects of the present invention upon which they can be implemented. Those skilled in the art will appreciate that embodiments may be implemented in conjunction with the aspect with which they are described, but may also be implemented with other embodiments of that aspect. When embodiments are mutually exclusive, or are otherwise incompatible with each other, it will be apparent to those skilled in the art. Some embodiments may be described in relation to one aspect, but may also be applicable to other aspects, as will be apparent to those of skill in the art.

BRIEF DESCRIPTION OF THE FIGURES

Further features and advantages of the present invention will become apparent from the following detailed description, taken in combination with the appended drawings, in which.

It will be noted that throughout the appended drawings, like features are identified by like reference numerals.

DETAILED DESCRIPTION

It is known that a UE can only transmit on PUR if it has a valid TA. When a UE moves, the TA can change, thus for mobile UEs, a UE must make sure that it has a valid TA before a PUR transmission. Further, the condition of validating a previously held TA to use PUR has the drawback that when the TA is found to be invalid, the UE has no other option but to fall back to either legacy RACH or early data transmission (EDT). It has been realised that this undermines the benefits that PUR can provide. Accordingly, it has been realised that if a UE can accurately estimate and predict its TA from a location, the UE could always use PURs.

Therefore, instead of validating a previously held TA, there is provided methods for a UE to estimate or predict the TA such that PURs can be used. Once the UE estimates the TA, the UE can assume that the estimated TA is valid and can therefore use PUR. Necessarily, it can be considered that the estimated TA must be accurate enough (i.e., greater than about 90% prediction accuracy).

It is important to note however that if an invalid TA is used, the consequences are not dramatic. For example, the PUR transmission may contaminate adjacent resources, resulting in the PUR transmission failing. As a result of the failure, the UE will fall back to the legacy RACH procedure (for example as illustrated in FIG. 1) which is the same result as if the UE determined that the TA is invalid.

As the purpose of using PUR is to avoid using system resources, time and a power consuming RACH procedure, the probability of a fallback to the RACH process may be used as a performance indicator to demonstrate the benefits of using TA prediction in place of TA validation.

With TA validation, if the UE has an invalid TA (i.e., if the UE's movement between PUR transmissions is more than about 700 m), the UE typically falls back to using the legacy RACH procedure. It is understood that the use of PUR is contingent on the UE remaining in the same cell and thus the condition of the UE moving from one cell to another is likely not considered. Furthermore, if the TA validation is inaccurate, for example where TA validation indicates that the TA is invalid when it is still valid (i.e., a false alarm), the UE will also fall back to using the legacy RACH procedure. Moreover, if a base station fails to decode and respond to the PUR transmission, the UE will fall back to using legacy RACH procedures.

According to embodiments, with TA prediction, the UE assumes that the predicted TA is valid as long as it is within the same cell. Therefore, the UE will only use RACH when its prediction is off by a significant amount (e.g TA error) such that the base station fails to decode and respond to the PUR transmission. This amount of TA error corresponds to a movement of the maximum tolerable movement (MTM) of about 700 m. It has been determined that the probability of the UE falling back to the legacy RACH procedure is greatly reduced using TA predication over TA validation.

According to embodiments, the probability determined via simulation of falling back to legacy RACH procedures for TA validation and TA prediction for different cell-sizes and for different movement probability (movement (D)>700 m) is shown in TABLE 1.

TABLE 1

| Cell size | Prob D >700 m in | Prob of RACH Fallback | |
|---|---|---|---|
| (meters) | same cell | TA Validation | TA Prediction |
| 1500 | 25% | 41.5% | 2% |
|  | 50% | 61% |  |
|  | 75% | 80% |  |
| 2500 | 25% | 50.5% | 9% |
|  | 50% | 67% |  |
|  | 75% | 83.5% |  |

TABLE 2

| Cell size (meters) | TA Validation False Alarm Rate |
|---|---|
| 1500 | 22% |
| 2500 | 34% |

As seen from TABLE 1, the probability of the UE to falling back to the legacy RACH procedure is greatly reduced when using TA predication vs TA validation. In addition, TABLE 2 defines the TA validation false alarm rate for different cell sizes.

For TA validation, RACH fallback=Prob (D>700 m in same cell)+Prob (D<700 m in same cell)*Prob (false alarm).

For TA prediction, RACH fallback=1−accuracy.

As the Prob(D>700 m in the same cell) is dependent on several factors such as operating environment, UE movement, and machine type transmission (MTC) traffic type, RACH fall back probabilities for different possible Prob (D>700 m in the same cell) are shown in TABLE 1. The simulation assumptions are as defined in TABLE 3.

TABLE 3

| Parameter | Value |
| --- | --- |
| # trials | 10,000 |
| Sub-carrier spacing | 15 kHz (LTE-M) |
| MTM | 700 m |

In accordance with an embodiment of the present disclosure, the UE may use power-based indicators, such as reference signal received power (RSRP) or received signal strength indicator (RSSI), as inputs to a method for TA prediction.

Figure 2:
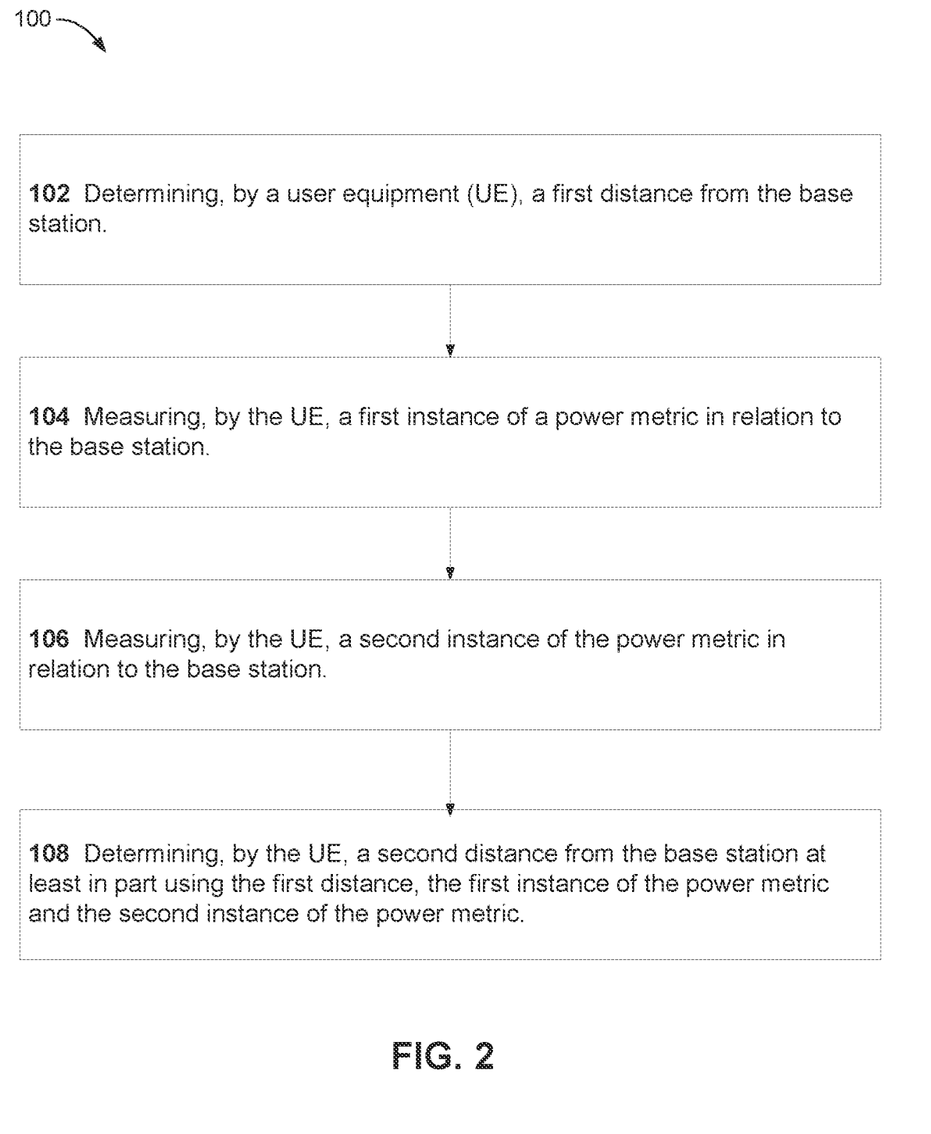
FIG. 2 illustrates a method for predicting timing advance with respect to a base station, according to embodiments.

FIG. 2 illustrates a method 100 for predicting timing advance with respect to a base station. The method includes, at step 102, determining, by a user equipment (UE), a first distance from the base station. The method further includes, at step 104, measuring, by the UE, a first instance of a power metric in relation to the base station. The method further includes, at step 106, measuring, by the UE, a second instance of the power metric in relation to the base station. The method further includes, at step 108, determining, by the UE, a second distance from the base station at least in part using the first distance, the first instance of the power metric and the second instance of the power metric.

As an example, consider a UE that has successfully received a valid TA from the base station when the UE was at position $M_1$ that is at a distance $d_1$ from the base station. The previously received successful TA may either be from a successful PUR transmission or from an initial PUR configuration. The UE then moves to a different position $M_2$ which is at a distance $d_2$ from the base station. The position $M_2$ is the location from which the UE wants to transmit on the PUR.

The mobile UE may thus use a method for TA prediction according to embodiments. The use of reference signal received power (RSRP) as a power metric is to be considered as a non-limiting example. Alternative power metrics include, but are not limited to, earliest arriving multipath, received signal strength indicator (RSSI) which may also be used as a substitute of RSRP, or in conjunction with RSRP for TA prediction.

The measured RSRP in dB at position $M_1$ may be defined as follows:

$$RSRP(d_1) = P_{tx} - PL(d_1)$$

where $P_{tx}$ is the transmit power of the cell-specific reference signal (CRS) transmitted by the base station, and $PL(d_1)$ is the path loss that the signal undergoes to reach a UE that is $d_1$ meters away from the base station.

Further, the $PL(d_1)$ in a general may be defined as follows:

$$PL(d_1) = k_1 \log_{10}(d_1) + X$$

where k and X are constants that depend on plural practical elements, for example antenna height and environment (e.g. urban, suburban or rural environment).

For example, non-line of sign (NLOS) urban, suburban, and rural macro path loss according to 3GPP TR 36.814 can be defined as follows:

$$PL(d_i) = 161.04 - 7.1 \log_{10}(W) + 7.5 \log_{10}(h) - (24.37 - 3.7(h/h_{BS})^2)\log_{10}(h_{BS}) + (43.42 - 3.1 \log_{10}(h_{BS}))(\log_{10}(d_i) - 3) + 20 \log_{10}(f_c) - (3.2(\log_{10}(11.75h_{UT}))^2 - 4.97)$$

The above path loss can be re-written in "k $\log_{10}(d_i)$+X" and defined as follows, wherein k is presented in {{k}} and X is presented in [[X]]:

$$PL(d_i) = \{\{(43.42 - 3.1 \log_{10}(h_{BS}))\}\}(\log_{10}(d_i) + [[161.04 - 7.1 \log_{10}(W) + 7.5 \log_{10}(h) - (24.37 - 3.7(h/h_{BS})^2)\log_{10}(h_{BS}) - 3*(43.42 - 3.1 \log_{10}(h_{BS}) + 20 \log_{10}(f) - (3.2(\log_{10}(11.75h_{UT}))^2 - 4.97)]]$$

where, W is the street width; h is the average building height; $h_{BS}$ is the eNB antenna height; $h_{UT}$ is the UE antenna height; and $f_c$ is the center frequency in Hz.

According to 3GPP TR 36.814, Urban Micro NLOS Hexagonal cell layout the path loss is defined as follows:

$$PL(di) = (36.7)(\log 10(d) + 26 \log 10(fc) + 22.7$$

According to 3GPP TR 36.814, Indoor hot spot NLOS path loss is defined as follows:

$$PL(di) = (43.3)(\log 10(di) + 20 \log 10(fc) + 11.5$$

According to 3GPP TR 36.814, Free space path loss is defined as follows:

$$PL(di) = (20)(\log 10(di) + 20 \log 10(fc) - 147.55$$

Given the above, the difference in RSRP, namely (RSRP($d_1$))−RSRP($d_2$)) or ΔRSRP for a given initial distance can be defined as follows:

$$\Delta RSRP = (P_{tx} - k_1 \log_{10}(d_1) - X_1) - (P_{tx} - k_2 \log_{10}(d_2) - X_2)$$

Assuming the method for determining path loss remains constant from $d_1$ to $d_2$ then $k_1 = k_2$ and $X_1 = X_2$. The above determination of ΔRSRP can be defined as follows:

$$\Delta RSRP = k(\log_{10}(d_2) - \log_{10}(d_1))$$

The above can be rearranged in order to determine $d_2$ as follows:

$$d_2 = 10^{\wedge}(\Delta RSRP/k + \log_{10}(d_1))$$

According to embodiments, using the above, a UE may estimate the distance $d_2$ between itself and the base station from its new position using the measured ΔRSRP and the previously known distance $d_1$ from the base station.

According to embodiments, the previous distance $d_1$ can be evaluated using the valid TA that the base station provided to the UE after the UE's successful PUR transmission at position $M_1$ or the valid TA provided by the base station while the UE was configuring PUR when the UE was at location $M_1$. For example, $d_1$ can be determined as follows:

$$d_1 = TA_1 * c/2$$

where c is the speed of light.

Similarly, the UE can estimate the TA at the new location $M_2$ using the determined $d_2$ as follows given that $TA_2 = 2*d_2/c$:

$$TA_2 = 2/c * 10^{\wedge}(\Delta RSRP/k + \log_{10}(TA_1 * c/2))$$

Given the above, the determination of "k" is to be performed by the UE in order to determine the new TA. It is understood that "k" is a constant that is dependent on the operating environment. It is understood that as base station has information indicative of the environment that it is in, the base station can be configured to signal 'k' in the system information that is transmitted to the UE directly. Alternately, signaling of the parameters can be performed substantially in line with the signaling of parameters that can be used for a threshold-based approach for TA validation.

In some embodiments, k may be provided as a function of RSRP($d_2$). Further, it is desired that the prediction of $d_2$ is accurate only to +/−700 m as it is understood that that is the tolerable movement of a UE for TA validity with LTE-M specifications with a 15 kHz subcarrier spacing.

In some embodiments the power metric is measured over only one sub-frame of a cell-specific reference signal (CRS). In some embodiments the power metric is measured over a set of sub-frames of a CRS. In some embodiments a maximum measurement from the set of sub-frames is used. In some embodiments the set of sub-frames is not consecutive.

In accordance with another embodiment of the present disclosure, the UE may use power-based indicators, such as RSRP or RSSI, as inputs to a single point and/or a multipoint regressor for TA prediction. The regressor may be a machine learning regressor or other configuration of regressor or other machine learning type configuration as would be readily understood.

Based on the above, it is understood that the above method is highly reliant on elements such as 'k', based on a path loss model. However, having or generating a path loss model which accurately models the path loss in the practical environment can be challenging. For some operating environments, determining such elements for each sector serviced by a base station, or parts of each sector serviced by a base station, may require detailed in-field measurements.

Figure 3:
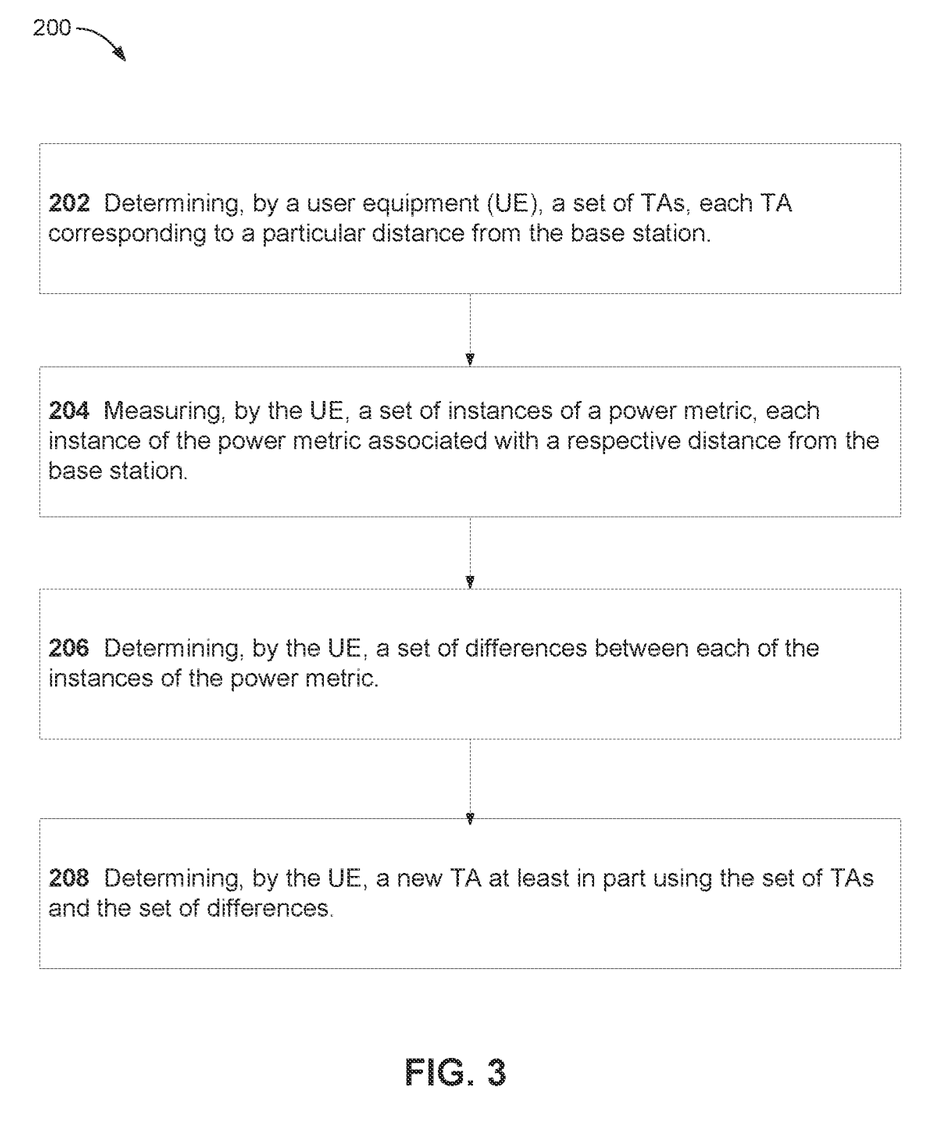
FIG. 3 illustrates another method for predicting timing advance with respect to a base station, according to embodiments.

FIG. 3 depicts another method 200 for predicting timing advance (TA) with respect to a base station. The method includes, at step 202, determining, by a user equipment (UE), a set of TAs, each TA corresponding to a particular distance from the base station. The method further includes, at step 204, measuring, by the UE, a set of instances of a power metric, each instance of the power metric associated with a respective distance from the base station. The method further includes, at step 206, determining, by the UE, a set of differences between each of the instances of the power metric. The method further includes, at step 208, determining, by the UE, a new TA at least in part using the set of TAs and the set of differences.

Figure 4A:
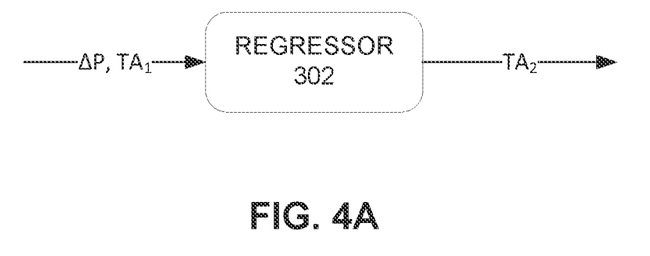
FIGS. 4A and 4B illustrate an example conceptualization of the method of FIG. 3, according to embodiments.
Figure 4B:
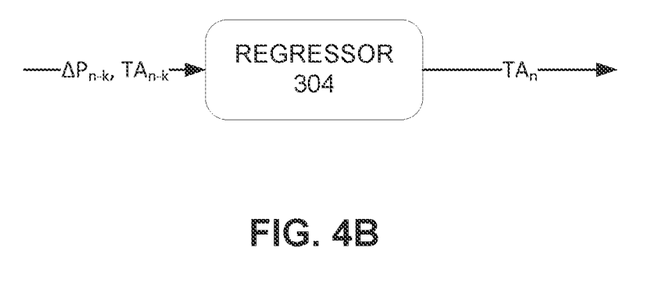

FIGS. 4A and 4B depict example conceptualizations of the method of FIG. 3 that is agnostic to 'k', wherein machine learning (ML) can be used. In some embodiments the power metric is at least one of a reference signal received power (RSRP), an earliest arriving multipath, and a received signal strength indicator (RSSI). It will be appreciated that other such power metrics may also be used.

FIG. 4A illustrates a single point regressor 302, such that the set of TAs may include a single TA. In FIG. 4A, $\Delta P_1$ represents a single difference between two instances of a power metric (such as RSRP). $TA_1$ and $TA_2$ represent a previously determined TA and the new TA, respectively. It is understood that supervised machine learning can be provided to enable the training of the machine learning regressor. For example, the ML regressor can be trained beforehand using either real-world measurement data (real world inputs and associated outputs) or synthetic simulation data (e.g. simulated inputs and associated outputs). The ML regressor may then be deployed in order to predict TA using snapshots of $\Delta P$ and TA.

FIG. 4B illustrates a multipoint regressor 304, such that the set of TAs may include a plurality of TAs. In FIG. 4B, $\Delta P_{n-k}$ represents multiple differences between multiple consecutive instances of a power metric (such as RSRP). $TA_{n-k}$ and $TA_n$ represent multiple previously determined TAs and the new TA, respectively. In place of using $TA_1$ and $\Delta P_1$ computed between $M_1$ and $M_2$, several previous TAs ($TA_{n-k}$, where k=1, 2, 3 . . . ) and their corresponding $\Delta P$s with respect to the current position can be used as inputs for a multipoint regressor 304. In some embodiments, the multipoint regressor 304 can be configured to use all the inputs at once to predict the new TA, for example simultaneously. In some embodiments, the multipoint regressor 304 can be configured to use the inputs individually to make separate predictions and then average the estimated TAs. Thus, several previous TAs and instances of a power metric may be used to predict the new TA.

In some embodiments the power metric is measured over only one sub-frame of a cell-specific reference signal (CRS). In some embodiments the power metric is measured over a set of sub-frames of a CRS. In some embodiments a maximum measurement from the set of sub-frames is used. In some embodiments the set of sub-frames is not consecutive. In some embodiments the set of instances of a power metric includes a plurality of instances of a power metric. In some embodiments determining the new TA is performed at least in part using machine learning.

In accordance with another embodiment of the present disclosure, the UE may use measurements of communication-based indicators as inputs to a single point and/or a multipoint regressor for TA prediction.

Figure 5:
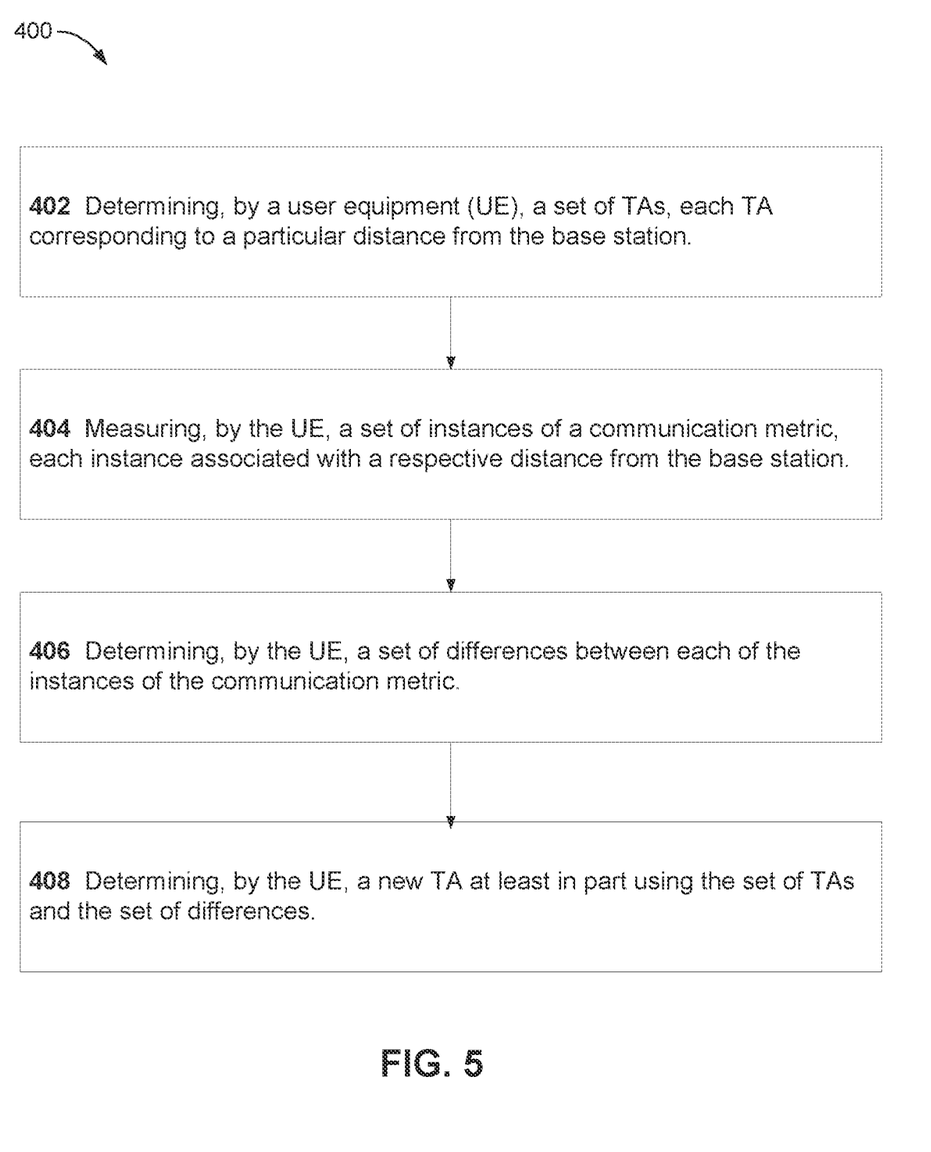
FIG. 5 illustrates yet another method for predicting timing advance with respect to a base station, according to embodiments.

FIG. 5 depicts another method 400 for predicting timing advance (TA) with respect to a base station. The method includes, at step 402, determining, by a user equipment (UE), a set of TAs, each TA corresponding to a particular distance from the base station. The method further includes, at step 404, measuring, by the UE, a set of instances of a communication metric, each instance associated with a respective distance from the base station. The method further includes, at step 406, determining, by the UE, a set of differences between each of the instances of the communication metric. The method further includes, at step 408, determining, by the UE, a new TA at least in part using the set of TAs and the set of differences.

Figure 6A:
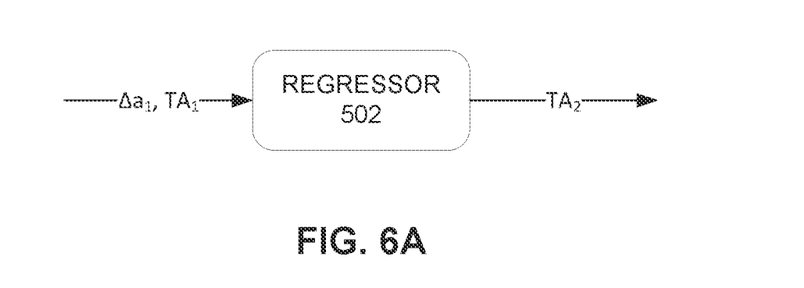
FIGS. 6A and 6B illustrate an example conceptualization of the method of FIG. 5, according to embodiments.
Figure 6B:
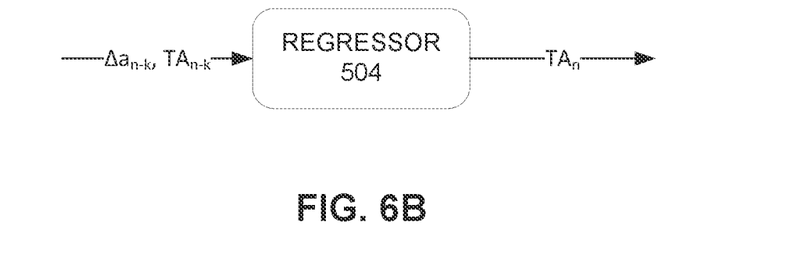

FIGS. 6A and 6B depict example conceptualizations of the method of FIG. 5 that is agnostic to 'k', using machine learning (ML). In some embodiments the communication metric is at least one of a time of arrival (ToA), and a strongest multipath component of a received signal. It will be reasonably appreciated that other such communication metrics may also be used.

FIG. 6A illustrates a single point regressor 502, such that the set of TAs may include a single TA. In FIG. 6A, $\Delta a_1$ represents a single difference between two instances of a communication metric. $TA_1$ and $TA_2$ represent a previously determined TA and the new TA, respectively.

FIG. 6B illustrates a multipoint regressor 504, such that the set of TAs may include a plurality of TAs. In FIG. 6B, $\Delta a_{n-k}$ represents multiple differences between multiple consecutive instances of a communication metric. $TA_{n-k}$ and $TA_n$ represent multiple previously determined TAs and the new TA, respectively. In place of using $TA_1$ and $\Delta a_1$ computed between $M_1$ and $M_2$, several previous TAs ($TA_{n-k}$, where k=1, 2, 3 . . . ) and their corresponding $\Delta a$'s with respect to the current position can be used as inputs for a multipoint regressor 504. The multipoint regressor 504 can be designed to either use all the inputs at once to predict the new TA or us them individually to make separate prediction and then average the estimated TA. Thus, several previous TAs and instances of a communication metric may be used to predict the new TA.

In some embodiments the communication metric is measured over only one sub-frame of a cell-specific reference signal (CRS). In some embodiments the communication metric is measured over a set of sub-frames of a cell-specific reference signal (CRS), since this provides better averaging and can mitigate noise. In some embodiments, an average of measurements over the set of sub-frames is used. In some embodiments a maximum measurement from the set of sub-frames is used. In some embodiments the set of sub-frames is not consecutive. In some embodiments the set of instances of a communication metric includes a plurality of instances of a communication metric. In some embodiments determining the new TA is performed at least in part using machine learning.

As previously discussed with respect to FIGS. 4A and 4B, in some embodiments the machine learning based method may use a supervised learning approach, where a machine is trained beforehand using multiple path loss models, i.e., multiple values of 'k'. The RSRP and TA values that are used for training may be generated using synthetic channel models. The machine can then be deployed to work under practical environments. The machine is robust enough to adapt to variations of the channel model between synthetic and practical conditions.

In some embodiments several machines may be trained beforehand for different possible values of 'k' using RSRP values obtained from synthetic channel models. During operation, the base station indicates the value of 'k' to be used using the system information. Based on this value, the UE determines the version of the machine to use for regression. In some embodiments, the value 'k' may be directly signaled or indirectly indicated via an index of a look-up table. It is understood that while this includes signaling overhead similar to the threshold-based method, it can provide superior prediction accuracy.

In some embodiments the machine may be trained using practical or real world data. For example, real world data may be collected for training under different channel environments, e.g., urban line of sight (LOS), rural non-LOS (NLOS), and the like. The real world data may be used for training the machine. The procedure may involve one machine that is 'k' agnostic, or multiple 'k'-dependent machines.

In some embodiments the machine may be trained using one of more values of 'k', however the machine may update the determined model in real time during operation based on feedback that the machine receives from the base station. Regardless of whether the UE uses the correct TA or an incorrect TA for PUR, the UE receives the accurate TA back from the base station with the acknowledgement to the PUR transmission.

In some embodiments the UE may use memory-based TA prediction which may exploit a pattern, if any, relating to the movement of the UE. Since the UE may move with finite velocity reasonably predictable patterns (for example predictable paths), the machine may exploit the correlation in consecutive RSRP and TA values to predict the current TA.

In some embodiments the standard procedure of measuring RSRP may involve the UE performing measurement over only one sub-frame (SF) of the CRS. In some embodiments, the UE can measure the RSRP over a larger set of SFs of the CRS, which can provide for improved averaging of the signal and may therefore mitigate noise.

In some embodiments, instead of averaging the measured powers over multiple SFs, the UE can use the maximum of the individual values, which may better counter channel fading.

In some embodiments different SFs used for RSRP evaluation may not be consecutive. The SFs may be sampled at interleaved instances to better capture slow fading effects of the channel that may be pronounced in slowly moving UEs.

Figure 7:
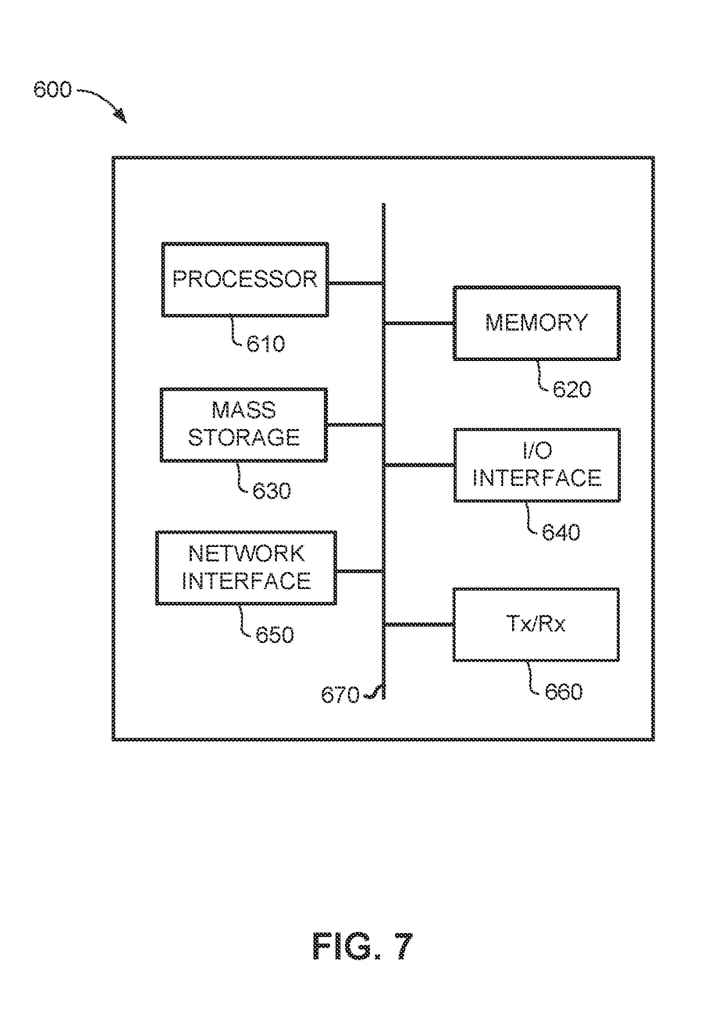
FIG. 7 illustrates a block diagram of a user equipment used for implementing methods disclosed herein, according to embodiments.

FIG. 7 is a schematic diagram of an electronic device 600 that may perform any or all of the steps of the above methods and features described herein, according to different embodiments of the present invention. For example, a user equipment (UE), base transceiver station (BTS), base station, wireless gateway or mobility router may be configured as the electronic device. It may be noted that the term "BTS" or "base station" refers to an evolved NodeB (eNB), New Radio (NR) or next generation NodeB (gNodeB or gNB), a radio access node, or another device in a wireless communication network infrastructure, such as a long term evolution (LTE) infrastructure, NR or 5G infrastructure, which performs or directs at least some aspects of wireless communication with wireless communication devices. The term "UE" refers to a device, such as a mobile device, machine-type-communication (MTC) device, machine-to-machine (M2M) equipment, Internet of Things (IoT) device, Internet of Vehicles (IoV) device or other device, which accesses the wireless communication network infrastructure via wireless communication with a base station.

As shown, the device includes a processor 610, memory 620, non-transitory mass storage 630, I/O interface 640, network interface 650, and a transceiver 660, all of which are communicatively coupled via bi-directional bus 670. According to certain embodiments, any or all of the depicted elements may be utilized, or only a subset of the elements. Further, the device 600 may contain multiple instances of certain elements, such as multiple processors, memories, or transceivers. Also, elements of the hardware device may be directly coupled to other elements without the bi-directional bus.

The memory 620 may include any type of non-transitory memory such as static random access memory (SRAM), dynamic random access memory (DRAM), synchronous DRAM (SDRAM), read-only memory (ROM), any combination of such, or the like. The mass storage element 630 may include any type of non-transitory storage device, such as a solid state drive, hard disk drive, a magnetic disk drive, an optical disk drive, USB drive, or any computer program product configured to store data and machine executable program code. According to certain embodiments, the memory 620 or mass storage 630 may have recorded thereon statements and instructions executable by the processor 610 for performing any of the aforementioned method steps described above.

It will be appreciated that, although specific embodiments of the technology have been described herein for purposes of illustration, various modifications may be made without departing from the scope of the technology. The specification and drawings are, accordingly, to be regarded simply as an illustration of the invention as defined by the appended claims, and are contemplated to cover any and all modifications, variations, combinations or equivalents that fall within the scope of the present invention. In particular, it is within the scope of the technology to provide a computer program product or program element, or a program storage or memory device such as a magnetic or optical wire, tape or disc, or the like, for storing signals readable by a machine, for controlling the operation of a computer according to the method of the technology and/or to structure some or all of its components in accordance with the system of the technology.

Acts associated with the methods described herein can be implemented as coded instructions in a computer program product. In other words, the computer program product is a computer-readable medium upon which software code is recorded to execute the methods when the computer program product is loaded into memory and executed on the microprocessor of the wireless communication device.

Acts associated with the methods described herein can be implemented as coded instructions in plural computer program products. For example, a first portion of the method may be performed using one computing device, and a second portion of the method may be performed using another computing device, server, or the like. In this case, each computer program product is a computer-readable medium upon which software code is recorded to execute appropriate portions of the method when a computer program product is loaded into memory and executed on the microprocessor of a computing device.

Further, each step of the methods may be executed on any computing device, such as a personal computer, server, PDA, or the like and pursuant to one or more, or a part of one or more, program elements, modules or objects generated from any programming language, such as C++, Java, or the like. In addition, each step, or a file or object or the like implementing each said step, may be executed by special purpose hardware or a circuit module designed for that purpose.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

We claim:

1. A method for predicting timing advance (TA) with respect to a base station, the method comprising:
   determining, by a user equipment (UE), a set of TAs, each TA corresponding to a particular distance from the base station;
   receiving, by the UE from the base station, one or more signals;
   measuring, by the UE, a set of instances of a power metric, each instance of the power metric associated with a respective distance from the base station, the measuring based at least in part on the one or more signals;
   determining, by the UE, a set of differences between each of the instances of the power metric; and
   determining, by the UE, a new TA at least in part using the set of TAs and the set of differences.

2. The method of claim 1 wherein the power metric is at least one of:
   a reference signal received power (RSRP);
   an earliest arriving multipath; and
   a received signal strength indicator (RSSI).

3. The method of claim 1 wherein the power metric is measured over only one sub-frame of a cell-specific reference signal (CRS) or a set of sub-frames of the CRS.

4. The method of claim 3 wherein a maximum measurement from the set of sub-frames is used.

5. The method of claim 1 wherein the set of TAs includes a single TA or a plurality of TAs.

6. The method of claim 1 wherein the step of determining the new TA is performed using a machine learning regressor.

7. The method of claim 6, wherein the machine learning regressor is configured as a multi-point regressor, the machine learning regressor determining the new TA using the set of TAs and the set of differences simultaneously.

8. The method of claim 6, wherein the machine learning regressor is configured as a multi-point regressor, the machine learning regressor determining a plurality of estimated TAs, each estimated TA based on one or more determined TAs and one or more associated differences, the machine learning regressor further determining the new TA based on an average of the plurality of estimated TAs.

9. The method of claim 6, wherein the machine learning regressor at least in part uses feedback from a base station for determining the new TA.

10. The method of claim 6, wherein the machine learning regressor at least in part uses a pattern of movement of the UE for determining the new TA.

11. A user equipment (UE) comprising:
    a processor; and
    a memory having stored thereon machine executable instructions which when executed by the processor configure the UE to:
       determine a set of timing advances (TAs), each TA corresponding to a particular distance from the base station;
       receive from the base station, one or more signals;
       measure a set of instances of a power metric, each instance of the power metric associated with a respective distance from the base station, the measuring based at least in part on the one or more signals;
       determine a set of differences between each of the instances of the power metric; and
       determine a new TA at least in part using the set of TAs and the set of differences.

12. The UE of claim 11 wherein a machine learning regressor is configured to determine the new TA.

13. A method for predicting timing advance (TA) with respect to a base station, the method comprising:
    determining, by a user equipment (UE), a set of TAs, each TA corresponding to a particular distance from base station;
    receiving, by the UE from the base station, one or more signals;
    measuring, by the UE, a set of instances of a communication metric, each instance associated with a particular distance from the base station, the measuring based at least in part on the one or more signals;
    determining, by the UE, a set of differences between each of the instances of the communication metric; and
    determining, by the UE, a new TA at least in part using the set of TAs and the set of differences.

14. The method of claim 13 wherein the communication metric is at least one of:
    a time of arrival (ToA); and
    a strongest multipath component of a received signal.

15. The method of claim 13 wherein the communication metric is measured over only one sub-frame of a cell-specific reference signal (CRS) or a set of sub-frames of the CRS.

16. The method of claim 15 wherein a maximum measurement from the set of sub-frames is used.

17. The method of claim 13 wherein the set of TAs includes a single TA or a plurality of TAs.

18. The method of claim 13 wherein the set of instances of the communication metric includes a plurality of instances of the communication metric.

19. A user equipment (UE) comprising:
    a processor; and
    a memory having stored thereon machine executable instructions which when executed by the processor configure the UE to:

determine a set of time advances (TAs), each TA corresponding to a particular distance from base station;

receive, from the base station, one or more signals;

measure a set of instances of a communication metric, each instance associated with a particular distance from the base station, the measuring based at least in part on the one or more signals;

determine a set of differences between each of the instances of the communication metric; and determine a new TA at least in part using the set of TAs and the set of differences.

20. A user equipment (UE) comprising:

a processor; and a memory having stored thereon machine executable instructions which when executed by the processor configure the UE to:

determine a set of time advances (TAs), each TA corresponding to a particular distance from base station;

measure a set of instances of a communication metric, each instance associated with a particular distance from the base station;

determine a set of differences between each of the instances of the communication metric; and determine, by a machine learning regressor, a new TA at least in part using the set of TAs and the set of differences.

* * * * *